United States Patent
Ljungar et al.

(10) Patent No.: US 6,749,949 B2
(45) Date of Patent: *Jun. 15, 2004

(54) METHOD OF PRODUCING FORMALDEHYDE LADEN LAYERED PRODUCTS HAVING REDUCED EMISSION OF FORMALDEHYDE

(75) Inventors: Robin Ljungar, Täby (SE); Ingvar Lindh, Bromma (SE); Salme Pirhonen, Sollentuna (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/093,480

(22) Filed: Mar. 11, 2002

(65) Prior Publication Data

US 2002/0168471 A1 Nov. 14, 2002

Related U.S. Application Data

(60) Provisional application No. 60/274,608, filed on Mar. 12, 2001.

(51) Int. Cl.$^7$ .............................................. B32B 27/42
(52) U.S. Cl. ................. 428/524; 428/528; 428/529; 428/536; 428/537.1; 427/341; 427/342; 427/382; 427/401; 156/331.9
(58) Field of Search ................. 428/528, 529; 427/341, 342, 401, 382; 156/331, 9

(56) References Cited

U.S. PATENT DOCUMENTS

| | | | |
|---|---|---|---|
| 4,264,760 A | | 4/1981 | Meyer ........................ 528/230 |
| 4,376,807 A | * | 3/1983 | Cannon |
| 4,409,375 A | | 10/1983 | Hartman ..................... 525/505 |
| 5,578,371 A | | 11/1996 | Taylor ........................ 428/288 |
| 5,635,583 A | | 6/1997 | Motter ........................ 528/243 |

FOREIGN PATENT DOCUMENTS

| | | | |
|---|---|---|---|
| DE | 3427694 | | 2/1986 |
| EP | 0027583 | | 4/1981 |
| EP | 0144 985 | * | 6/1985 |
| GB | 1598199 | | 9/1981 |
| JP | 114 629 | * | 5/1987 |

OTHER PUBLICATIONS

Derwent Abstract XP–002171076 of JP62114629.
English translation of Japanese Laid–Open No. 1987–114629.

* cited by examiner

Primary Examiner—Leszek B Kiliman
(74) Attorney, Agent, or Firm—David J. Serbin

(57) ABSTRACT

A method of producing formaldehyde laden layered products, the products having reduced emission of formaldehyde, of at least 2 layers, at least one of the layers being a board or veneer, comprising a step of treating at least one of the surfaces of said board or veneer, prior to bonding the layers together, with a solution comprising an inorganic sulphur containing salt. The invention also relates to a flooring material obtained by the method.

23 Claims, No Drawings

METHOD OF PRODUCING FORMALDEHYDE LADEN LAYERED PRODUCTS HAVING REDUCED EMISSION OF FORMALDEHYDE

This application claims benefit of 60/274,608 filed Mar. 12, 2001.

The present invention relates to a method of producing formaldehyde laden layered products having reduced emission of formaldehyde having at least two layers at least one of which being a board or a veneer. It also relates to a board, a veneer and a flooring material obtained by the method, to an aqueous solution comprising ammonium sulphite or bisulphite and urea for use in the method and to a process for preparation of the aqueous solution. The method, according to the present invention, comprises treatment prior to bonding the layers together of at least one of the surfaces of said board or veneer with a solution comprising an inorganic sulphur containing salt.

Aldehydes, especially formaldehyde based resins, are widely used in adhesive compositions, which are used in the manufacture of construction materials such as panelling, decking, etc.; home furnishings such as furniture, flooring material, etc. Typically, these adhesives compositions contain a substantial molar excess of formaldehyde. Some of this excess formaldehyde is released upon curing of the resin during the manufacture of the product. However, it is well known that formaldehyde continues to be released from these products even after the manufacturing process is completed. Thus, formaldehyde in the indoor air has been a major concern for many years.

Several attempts have been made for many years for reducing formaldehyde emission, but all entail significant mechanical, chemical, environmental or economical disadvantages.

EP 0 027 583 discloses a method of reducing the emission of formaldehyde from particleboard bound with carbamide resin. The boards are treated with a thermally decomposable ammonium compound, such as ammonium carbonate, subsequent to pressing. The thus treated boards are then stacked and stored at temperatures from 40 to 70° C., so that ammonia can be released.

Moreover, layered flooring material, such as three-layer parquet floor can emit formaldehyde due to the different wood layers being normally bonded together by gluing with formaldehyde based adhesives. The top layer usually consists of hardwood, the middle layer of softwood or a board, for example, MDF, HDF or particle board and the bottom layer of a veneer. The top layer is usually treated with a formaldehyde free UV-lacquer or an oil to protect the surface, which also may function as a barrier to the formaldehyde emission. The different parts of a parquet sample, such as the front, the back, and the edges, give different emission rates. For example, the formaldehyde emission from the backside can be 20 times higher than that from the front side.

Furthermore, there is an increasing demand for parquet flooring which can meet the required E1 value obtained in a chamber test according to the Swedish standard SS 270236 (SS 1988). In cases where the emission test for parquet flooring has been performed with samples having unexposed backsides and sealed edges, the obtained emission values have been very low, often under 0.05 $mg/m^3$ (the limit value for E1 being 0.13 $mg/m^3$).

Additionally, there is proposed a new European standard, EN 717-1, for formaldehyde emission determination, according to which all samples to be measured will have exposed backside and partially exposed edges. This makes it more difficult for the flooring producers to achieve extremely low formaldehyde emission values.

Furthermore, there will be demands on meeting the Japanese standard JAS SIS20, which involves a desiccator measurement where the backside and the edges of the sample cannot be sealed, but they are totally exposed.

Thus, technical solutions are still sought for the need to decrease the emission of formaldehyde from wood-based products containing formaldehyde-based resins, meeting the new more strict standards for formaldehyde emission from these products.

Accordingly, the present invention provides a method of producing wood-based products containing formaldehyde based resins having reduced emission of formaldehyde from, by which the above mentioned problems are overcome.

The method according to the invention comprises treatment of at least one of the surfaces of a board or veneer, comprised in a layered product having at least two layers, prior to bonding the layers together, with a solution comprising an inorganic sulphur containing salt.

By "formaldehyde laden layered products" is herein meant a layered product containing formaldehyde based resins, wherein the layers are bonded to each other by a formaldehyde based adhesive and in case one or more of the layers is a board that the board as such may also be bonded with a formaldehyde based adhesive.

Suitably, the concentration of the inorganic sulphur containing salt in the solution is from about 1 to about 30 weight %, preferably from about 5 to about 20 weight %, and most preferably from about 8 to about 13 weight %. Although application of the salt in the form of a solution is preferred, according to the invention, it may also be applied in the form of a powder, if so desired. For environmental reasons, the solution is suitably an aqueous solution, although other solvents than water may be used. The salt solution may be applied by using any conventional coating technique, such as roller coating, curtain coating, or, spray coating. The amount of salt solution applied, when only one of the surfaces is treated, is suitably from about 30 to about 90 $g/m^2$, preferably from about 40 to about 80 $g/m^2$, and most preferably from about 55 to about 65 $g/m^2$. If both of the surfaces are to be treated, then the applied amount per side is suitably half of the amount if only one of the surfaces would be treated. In order to avoid disturbance of the moisture balance of the treated product large amounts of salt solution are undesirable.

The inorganic sulphur salts according to the invention have a very high water-solubility, whereas carbonate salts have a rather limited water-solubility. Thus, in order to obtain an effective salt solution resulting in the desired reduction of formaldehyde emission, a larger amount of carbonate salt solution comparing to that of sulphite salt solution, is required to be applied onto the surface to be treated, which can affect negatively the moisture balance of the treated product and therefore even of the finished layered product.

Moreover, the inorganic sulphur salts according to the invention do not discolour the finished layered product, especially its outer surface, whereas carbonate salts may have a discolouring effect on the outer layer of the finished product and especially on oak surfaces.

Suitable inorganic sulphur containing salts include sulphite or bisulphite salts such as, for example, alkali metal sulphites or bisulphites or ammonium sulphites or bisulphites. Water-soluble sulphite or bisulphite salts are preferred.

Preferably, ammonium sulphite or bisulphite is used, and most preferably ammonium sulphite.

The method of reducing the amount of formaldehyde liberated by materials and products prepared with formaldehyde based resins is applicable to all formaldehyde based resins, for example, it is applicable to urea-formaldehyde, melamine-formaldehyde, phenol-formaldehyde resins and the like as well as copolymers, blends and mixtures made therefrom.

In a preferred embodiment of the invention, urea is added to the inorganic sulphur containing salt solution. Even though the inorganic sulphur containing salt does alone effectively reduce the emission of formaldehyde, the addition of urea to the salt solution improves further the reduction of formaldehyde emission. Suitably, the weight ratio of urea to sulphur-containing salt is from about 1:10 to about 1:1, preferably from about 2:10 to about 8:10, and most preferably from about 3:10 to about 6:10.

The board to be treated according to the invention may be any kind of board such as particle board, chip board, or, fibre board, and it may be bound with adhesives based on formaldehyde based resins or other non-formaldehyde based resins.

The veneer to be treated according to the invention may be any kind of wood veneer, preferably untreated veneer.

The boards or veneers may be conditioned after the application of the salt solution to desired moisture content before the bonding stage. Furthermore, although only one of the surfaces of the veneer or board need be coated with the salt solution to achieve the benefits of the invention, depending on the application method both of the surfaces may be coated if so desired.

The layers can be bonded by using any of the known conventional techniques, for example, by gluing and pressing.

Preferably, the board or veneer treated by the method according to the invention constitutes the backside surface or layer of the layered product. This gives rise to a significant reduction of the emission of formaldehyde from the backside of the layered product.

The layered product, according to the invention, may be any wood-based layered product. Suitably it is a flooring material, preferably a parquet flooring and most preferably a three-layer parquet flooring.

The aqueous salt solution, according to the present invention, comprises an ammonium sulphite or bisulphite and urea. Preferably, it comprises ammonium sulphite and urea.

The weight ratio between the salt and the urea is suitably from about 1:10 to about 1:1, preferably from about 2:10 to about 8:10, and most preferably from about 3:10 to about 6:10.

Suitably, the concentration of the ammonium salt and urea in the solution is from about 1 to about 30 weight %, preferably from about 5 to about 20 weight %, and most preferably from about 8 to about 13 weight %.

The process for preparation of the salt solution, according to the invention, comprises mixing of the salt, the urea and the water in a mixing ratio, which gives the desired concentration of salt and urea in the solution.

In a preferred embodiment of the process for preparation of the salt solution according to the invention, the ammonium salt is in the form of an aqueous solution before mixing with the urea and required additional water for receiving a solution with the desired salt concentration.

In a further preferred embodiment of the process for preparation of the salt solution, according to the invention, both the ammonium salt and the urea are in the form of aqueous solutions before mixing with each other for preparing an aqueous solution according to the invention with the desired salt concentration.

The invention is further illustrated by means of the following non-limiting examples. Parts and percentages relate to parts by weight respectively percent by weight, unless otherwise stated.

EXAMPLES

The ammonium sulphite solution used in the examples according to the present invention was prepared by mixing 19.7 kg of ammonium sulphite solution (35–36 weight %) and 3.0 kg urea with water to obtain a 10 weight % aqueous salt solution.

The ammonium carbonate solution used in the comparison examples was prepared by mixing 31.6 kg urea, 40.0 kg ammonium bicarbonate and 28.4 kg ammonium carbonate with water to obtain a 27.8 weight % aqueous salt solution.

Example 1 (Reference)

Veneers of spruce (2 mm thick) were glued on both sides of the core material of pine with a thermosetting urea-formaldehyde resin and a hardener.

Example 2 (Comparison)

Veneers of spruce (2 mm thick) were pre-treated with an ammonium carbonate solution, on both sides and then left to dry for 4 hours before gluing and pressing in the same way as in example 1.

Example 3

Veneers of spruce (2 mm thick) were pre-treated with an inorganic sulphite solution, on both sides, left to dry and then glued and pressed in the same way as in example 2.

Example 4 (Comparison)

The procedure in example 1 was repeated, except that after gluing and pressing, the sample was left 15 minutes at ambient temperature and then the backside (the side facing away from the glue line) of the veneers was sprayed with an ammonium carbonate solution.

Example 5

The procedure in example 4 was repeated, except that the backside of the veneers was sprayed with an ammonium sulphite solution.

The formaldehyde emission from samples prepared according to the above examples was measured with a Field and Laboratory Emission Cell (FLEC) after 24 hours conditioning. The results are shown in table 1 below.

TABLE 1

| Example | Treatment of the veneers | Concentration of the salt solution, % by weight | Applied amount salt solution, g/m² per treated side | Emission μg/m²h after 24 hours |
|---|---|---|---|---|
| 1 | Without treatment | | | 733 |
| 2 | Pre-treated with an ammonium carbonate solution | 27.8 | 31 | 44 |
| 3 | Pre-treated with an ammonium sulphite solution | 10 | 29 | <10 |

As can be seen from table 1, the formaldehyde emission from the samples containing treated veneers was generally significantly lowered compared to that of the samples containing untreated veneers. In addition, treatment of the veneers with a salt solution according to the invention gives rise to an even greater lowering of the formaldehyde emission comparing to that when the veneers are treated with an ammonium carbonate solution. This improvement becomes even more evident considering the fact that the concentration of the ammonium sulphite solution used was only about one third of that of the carbonate solution and that the applied amount (g/m²) of the ammonium sulphite solution was less than that of the applied ammonium carbonate solution.

Example 6

A spruce veneer for use in the manufacture of edge-glued 14 mm 3-layer parquet flooring was pre-treated on both sides with an ammonium sulphite solution. The veneer was conditioned to about 7% moisture content before gluing to the core material of pine, with a thermosetting urea-formaldehyde resin and a hardener. The face lamella of ash was glued to the top of the core material with the same urea-formaldehyde resin/hardener mixture.

Example 7 (Comparison)

Example 6 was repeated except for that the spruce veneer was pre-treated with an ammonium carbonate solution.

Example 8 (Reference)

A parquet flooring sample was prepared in the same way as in examples 6 and 7, except for that the spruce veneer used was not treated with any salt solution.

Samples prepared according to all of the examples 6, 7 and 8 after being pressed and cooled to ambient temperature and the top layer was treated with a lacquer or oil, were wrapped in formaldehyde impermeable plastic. The formaldehyde emission was measured in a 1 m³ chamber according to the Swedish standard SS 270236 (SS 1988) with exposed front and backside and sealed edges. The results are shown in table 2 below.

TABLE 2

| Example | Treatment of the veneers | Concentration of the salt solution, % by weight | Applied amount salt solution, g/m² per treated side | Emission, mg formaldehyde/m³ air |
|---|---|---|---|---|
| 6 | Pre-treated with an ammonium sulphite solution | 10 | 29 | 0.02 |
| 7 | Pre-treated with an ammonium carbonate solution | 27.8 | 31 | 0.02 |
| 8 | Untreated | | | 0.05 |

Evidently, pre-treatment of the veneers with an inorganic sulphite solution according to the invention unexpectedly reduces the emission of formaldehyde more effectively without need of using large amounts of a rather concentrated salt solution. Use of large amounts of the salt solution results in that a larger amount of water is supplied onto the veneers, which can have a negative influence on the moisture balance of the product.

What is claimed is:

1. A method of producing formaldehyde laden layered products, the products having reduced emission of formaldehyde, of at least 2 layers, at least one of the layers being a board or veneer, comprising a step of treating at least one of the surfaces of said board or veneer, prior to bonding the layers together, with a solution comprising an inorganic sulphur containing salt.

2. A method according to claim 1, wherein said solution is an aqueous solution.

3. A method according to claim 1, wherein said solution has an inorganic sulphur salt content in the range of from about 5% to about 20% by weight.

4. A method according to claim 2, wherein said solution has an inorganic sulphur salt content in the range of from about 5% to about 20% by weight.

5. A method according to claim 1, wherein the inorganic sulphur salt is ammonium sulphite or bisulphite.

6. A method according to claim 1, wherein the solution further comprises urea.

7. A method according to claim 6, wherein the weight ratio of urea to inorganic sulphite salt is from about 3:10 to about 6:10.

8. A method according to claim 1, wherein the board or veneer treated by the method according to claim 1 constitutes the backside surface or layer of the layered product.

9. A method according to claim 1, wherein the layered product is a flooring material.

10. A method according to claim 9, wherein said material is a parquet flooring.

11. A method of producing formaldehyde laden flooring materials, the materials having reduced emission of formaldehyde, of at least 2 layers, at least one of the layers being a board or a veneer constituting the backside surface or layer of the flooring material, comprising a step of treating at least one of the surfaces of said board or veneer, prior to bonding the layers together, with an aqueous solution comprising ammonium sulphite or bisulphite.

12. A method according to claim 11, wherein said solution has a content of ammonium sulphite or bisulphite in the range of from about 5% to about 20% by weight.

13. A method according to claim 11, wherein the solution further comprises urea.

14. A method according to claim 12, wherein the weight ratio of urea to inorganic sulphite salt is from about 3:10 to about 6:10.

15. A method according to claim 11, wherein said flooring material is a parquet flooring.

16. A formaldehyde laden layered product of at least 2 layers, the product having reduced emission of formaldehyde, at least one of the layers being a board or a veneer, obtained by treating at least one of the surfaces of said board or veneer, prior to bonding the layers together, with a solution comprising an inorganic sulphur containing salt.

17. A formaldehyde laden layered product according to claim 16, wherein the board or veneer treated with the solution comprising the inorganic sulphur containing salt constitutes the backside surface or layer of the layered product.

18. A formaldehyde laden layered product according to claim 16, wherein the solution has a content of inorganic sulphur containing salt in the range of from about 5% to about 20% by weight.

19. A formaldehyde laden layered product according to claim 16, wherein the inorganic sulphur containing salt is ammonium sulphite or bisulphite.

20. A formaldehyde laden layered product according to claim 16, which is a flooring material.

21. A flooring material according to claim 20, which is a parquet flooring.

22. A flooring material, of at least 2 layers, the material having reduced emission of formaldehyde, at least one of the layers being a board or a veneer constituting the backside surface or layer of the flooring material, obtained by treating at least one of the surfaces of said board or veneer, prior to bonding the layers together, with an aqueous solution comprising ammonium sulphite or bisulphite.

23. A flooring material according to claim 22, which is a parquet flooring.

* * * * *